Sept. 10, 1957 T. S. DAYTON 2,805,522
APPARATUS FOR SHARPENING WOOD BITS
Filed Nov. 15, 1954 2 Sheets-Sheet 1

INVENTOR.
Theodore S. Dayton
BY
Agent

Sept. 10, 1957  T. S. DAYTON  2,805,522
APPARATUS FOR SHARPENING WOOD BITS
Filed Nov. 15, 1954  2 Sheets-Sheet 2

INVENTOR.
Theodore S. Dayton
BY
Agent

United States Patent Office 2,805,522
Patented Sept. 10, 1957

2,805,522

APPARATUS FOR SHARPENING WOOD BITS

Theodore S. Dayton, Portland, Oreg.

Application November 15, 1954, Serial No. 468,608

14 Claims. (Cl. 51—95)

This invention pertains to grinding apparatus, and relates particularly to apparatus for grinding and sharpening the internal cutting edges of wood bits with speed and precision.

The construction of bits or drills for cutting holes in wood and like materials is entirely different from the construction of bits or drills designed for cutting holes in metal. Metal drilling bits are constructed with a conical tip having the cutting edges formed on the outer periphery thereof, thereby rendering the grinding or sharpening of these cutting edges a relatively simple matter. For example, metal drilling bits of the twist drill type are readily sharpened by positioning the outer cutting surfaces in contact with the flat surface of a conventional grinding wheel. The positioning of the bit may be accomplished by hand or by special apparatus designed to support the bit in proper position.

On the other hand, bits of the wood drilling type are provided with cutting edges which are recessed inwardly between a central spur and opposed peripheral cutting lips, the central spur functioning to center the drill and the peripheral cutting lips functioning to sever the wood fibers at the periphery of the hole being cut, preliminary to removal of the wood by the internal recessed chisel edges. The construction of a wood bit therefore renders more difficult the precise grinding and sharpening of the cutting edges, as compared with the aforementioned twist drill construction, since the cutting edges of a wood bit are formed internally, rather than on the external surface. The sharpening of wood bits is further complicated by the fact that proper angular relationship between the chisel edges, the peripheral cutting lips and the central spur must be maintained, and the cutting edges must also follow the helical contour of the drill.

It is a principal object of the present invention to provide apparatus for grinding and sharpening the internal cutting edges of wood bits with precision and facility.

Another important object of the present invention is to provide apparatus for grinding and sharpening the cutting edges of wood bits, wherein the bit is ground in quadrants and all the internal surfaces of each quadrant are ground simultaneously to proper contour.

A further important object of this invention is the provision of apparatus for grinding and sharpening wood bits, wherein the grinding of the internal cutting edges of the bit automatically follows the helical contour of the drill flute.

A still further object of this invention is to provide an apparatus for grinding and sharpening wood bits, including means for initially positioning the wood bit in precise proper position with respect to the grinding element of the apparatus.

Still another important object of the present invention is the provision of grinding apparatus for grinding and sharpening wood bits by means of a rotary grinding wheel contoured to the internal shape of the cutting edges of the wood bit.

A still further important object of the present invention is to provide, in combination with apparatus for grinding and sharpening wood bit and having a contoured grinding wheel, dressing means for maintaining the proper contour of the grinding wheel.

Another important object of this invention is to provide apparatus for grinding and sharpening wood bits, wherein is accommodated the grinding of the center spur of the bit to the shape of a four sided pyramid.

Another object of this invention is to provide apparatus of the class described, which is of simplified construction for economical manufacture, and which requires a minimum of maintenance and repair.

The foregoing and other objects and advantages of the present invention will appear from the following detailed description, taken in connection with the accompanying drawings, in which.

Figures 1, 2:
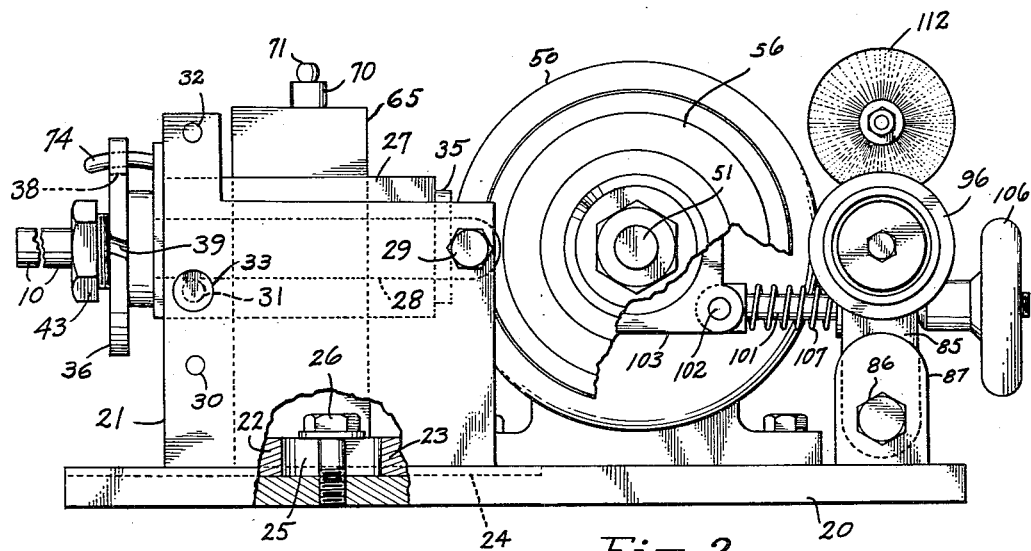
Figure 1 is a fragmentary plan view of grinding apparatus embodying the features of the present invention, parts thereof being broken away to disclose details of construction, and other parts thereof being shown in broken lines.
Figure 2 is a front elevation of the apparatus shown in Figure 1, with parts thereof broken away to disclose details of construction.

Referring now particularly to Figures 3 to 7 of the drawings, there is shown a conventional wood bit having a rearward shank section 10 and a forward cutting section 11 of helical form, terminating in a forward cutting tip 12. The forward cutting section is formed as a helical body which provides opposed flutes 13, and the body 11 is hollow ground along a portion of its periphery to form the raised lands 14 which function as cutting edges.

The forward cutting tip 12 is provided with a central projecting spur 15, intermediate chisel surfaces 16 on opposite sides of the spur, and the peripheral cutting lips 17 which project forwardly from the outer sides of the recessed chisel surfaces 16.

Figure 3:
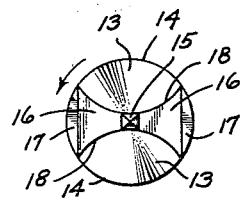
Figure 3 is a plan view of a conventional wood bit, showing the cutting end thereof.

The center spur 15 extends forwardly a distance greater than the cutting lips 17, whereby to first penetrate the wood and stabilize the bit. The cutting lips 17 project forwardly a distance greater than the cutting edges 18 of the chisel surfaces 16, whereby to cut the fibers of wood defining the periphery of the hole to be drilled, preliminary to removal of the wood within said periphery by the action of the chisel edges 18. It is to be noted that the chisel surfaces 16 taper rearwardly from their cutting edges 18 to enhance the cutting operation. The cutting edges 18 are indicated in Figure 3 with reference to counterclockwise rotation of the bit, as indicated by the arrow. The degree of taper of the chisel surfaces 16 may be varied within rather wide limits. In general, the greater the degree of taper, the faster will be the cutting action of the bit.

Referring now particularly to Figures 1 and 2 of the drawings, the grinding apparatus includes a base plate 20 upon which the elements of the apparatus are supported. Adjacent the left end of the base there is an upstanding frame 21, the bottom of which is offset inwardly to form the supporting flange 22. On the under side of this support is formed a longitudinal key 23 which is received within a key way 24 formed in the base 20. An elongated slot 25 is formed in the support 22 and key 23 to receive therethrough the securing bolt 26 which is anchored removably in a threaded opening in the base 20. Thus, the frame 21 may be adjusted to various positions along the key way 24, within the limits defined by the elongated opening 25, for purposes explained in detail hereinafter.

A barrel 27 is provided with an elongated connecting flange 28, the forward end of which is pivotally secured to the frame 21 by means of pivot bolt 29. Adjacent the rearward end of frame 21 there is provided a plurality of transverse holes 30, 31, 32. A pin 33 is adapted to be received selectively within each of said holes for engagement at its inner end with the flange 28. Thus, the barrel 27 may be adjusted to any one of three positions by inserting the pin in one of the desired holes and pivoting the barrel about the pivot bolt 29 to bring the flange 28 into the contact with the pin. The purpose of this provision is more fully explained hereinafter.

The barrel 27 is provided with an internal longitudinal opening of cylindrical form to receive slidably therethrough a sleeve 35. The rearward end of the sleeve is provided with a radially projecting flange 36 which is provided at 90° intervals about its circumference with inwardly projecting slots 37, 38, 39, and 40. The sleeve is hollow (Figure 8), providing a longitudinal bore which is reduced in diameter at the forward end by means of the tapered internal shoulder 41. The rearward end of the sleeve is provided with internal threads 42 which are adapted to receive the externally threaded hollow bushing 43.

A collet 44 is receivable within the bore of sleeve 35. In the embodiment illustrated, the collet is cylindrical in form and is provided with an internal bore adapted to receive therethrough the wood bit 10, 11. The collet is slotted at 90° intervals, one pair of diametrically opposed slots 45 extending from the forward end of the collet and the other pair of diametrically opposed slots extending from the rearward end thereof. The opposite ends of the collet are tapered outwardly to reduced diameters, corresponding to the taper of the forward shoulder 41 and the inner taper 46 of the bushing 43. Thus, with the wood bit positioned within the collet, tightening of the bushing 43 within the sleeve 35 causes the taper 46 to be moved closer to the tapered shoulder 41, resulting in radially inward compression of the opposite ends of the collet, whereby to firmly secure the wood bit to the sleeve.

Mounted on the base 20 adjacent the frame 21 is a motor 50, preferably electric, the drive shaft 51 of which is preferably arranged parallel to and in the horizontal plane of the axis of bolt 29. An intermediate portion of the projecting drive shaft is formed with a fast taper 52 and the terminal end thereof is provided with threads 53. A threaded hub 54 having a rear flange 55 is receivable on the fast taper to form a support for the grinding wheel 56. A threaded collar 57 is also receivable on the hub in front of the grinding wheel to secure the latter upon the hub. The collar is threaded onto the hub and tightened by a conventional spanner wrench which engages the spaced recesses 58 formed at diametrically opposite sides of the hub. The assembly is secured on the shaft 51 by means of nut 59. It is to be noted that the securing collar 57 permits the assembly to be removed from the shaft as a unit.

Figure 4:
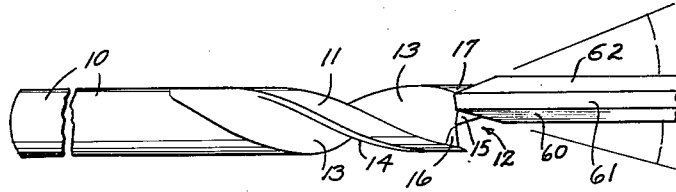
Figure 4 is a fragmentary foreshortened plan view showing the relative position of a wood bit and the grinding wheel during the grinding operation.

Referring particularly to Figure 1 of the drawings, it is to be noted that the plane of the front surface of the grinding wheel 56 lies adjacent the common axis of barrel 27, sleeve 35 and wood bit 10, 11. The grinding wheel is contoured to the internal shape of the wood bit cutting tip, i. e. the internal shape defined by the surfaces of a quadrant of the bit, including the spur 15, chisel surface 16 and peripheral cutting lip 17. Referring particularly to Figure 4 of the drawings, the grinding wheel is contoured to provide an outer edge 60 conforming to the taper of the center spur 15, an intermediate peripheral edge 61 contoured to the shape of the chisel surface 16, and an inner edge 62 contoured to the inner surface of the peripheral cutting lip 17. Thus, by properly positioning the wood bit within the barrel 27, as explained in detail hereinafter, the contoured grinding wheel effects simultaneous grinding and sharpening of all said surfaces of the wood bit.

Figure 8:
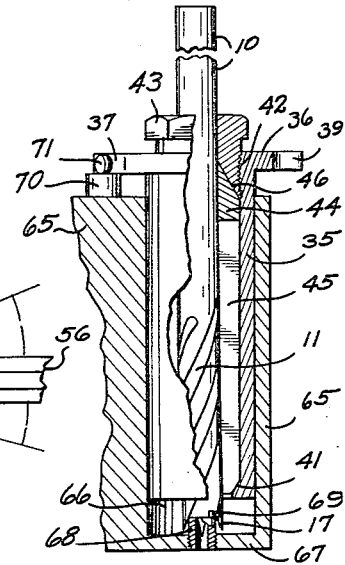
Figure 8 is a fragmentary sectional view taken along the line 8—8 in Figure 1, showing details of construction of the bit-positioning section of the apparatus.
Figure 5:
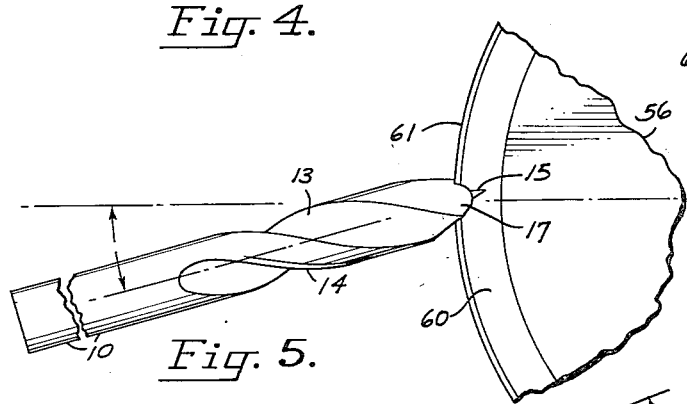
Figure 5 is a fragmentary foreshortened view in side elevation showing another angular relation between the wood bit and the contoured grinding wheel in the grinding position of Figure 4.

It will be apparent from the foregoing description that the cutting tip of the wood bit must be positioned precisely with respect to the grinding wheel in order that the cutting surfaces of the wood bit may be maintained in proper position. To this end there is provided means for orienting the wood bit precisely within the sleeve 35 and for positioning said sleeve in selective precise positions with respect to the grinding wheel. Referring particularly to Figures 1 and 8 of the drawings, there is mounted upon the base 20 rearwardly of the frame 21 an upstanding block 65. An opening 66 is formed vertically in the block, terminating adjacent the bottom 67 thereof. The opening 66 is provided with a diameter equal to the outer diameter of sleeve 35, whereby to receive the latter slidably therein.

A hollow cylindrical post 68 is secured in the base 67, at the axial center of the opening 66, as by means of the interengaging threads illustrated. A lug 69 projects upwardly from the post adjacent the periphery of the latter. The diameter of the post is smaller than the internal diameter defined by the base of the peripheral cutting lips 17, whereby to permit the chisel edges 18 to rest upon the upper surface of the post. The center spur 15 is received within the hollow bore of the post, as best indicated in Figure 8, and the post extends upwardly from the base 67 a distance sufficient to support the wood bit cutting lips 17 out of contact with said base.

Mounted upon the upper surface of the block 65 adjacent the opening 66 is a pedestal 70, which is formed at its upper end in the shape of a spherical ball 71. The pedestal and ball are positioned with respect to the projecting lug 69 of the post 68 in such manner as to orient the cutting edges of the wood bit precisely with respect to said pedestal and ball. The ball is proportioned to be received within one of the slots formed in the sleeve flange 36, with said flange resting upon the pedestal 70. Thus, it will be understood that when the wood bit is supported in proper position upon the post 68, as described hereinbefore, the cutting edges of bit are properly and precisely positioned with respect to the slots formed in the flange 36.

Referring now particularly to Figure 1 of the drawings, the assembled sleeve 35 is shown inserted within the barrel 27. A guide rode 74 is secured to the barrel by means of the projecting lug 75, and extends rearwardly for reception within one of the slots formed in the sleeve flange 36. In Figure 1, the guide rod is shown received within slot 38.

It is to be noted that guide rod 74 is curved to conform with the helical contour of the wood bit flutes 13. The purpose of this construction is described more fully hereinafter. In view of the helical shape of the guide rod 74, each of the slots 37, 38, 39 and 40 are formed transversely of the flange 36 at the oblique angle corresponding to the angular contour of the guide rod. It is because of this angular construction of the slots that the ball 71 is provided upon the pedestal 70, in order to position the sleeve 35 and flange 36 firmly against rotation within the opening 66. This is necessary in order to insure precise alignment of the cutting edges of the wood bit with one of the slots in the flange 36.

An adjustable stop 76 is provided with a threaded section 77 for threaded engagement in a projecting lug 78 extending from the barrel 27. A lock nut 79 is provided on the threaded section of the adjustable stop for securing the latter in any desired position of adjustment. This stop functions in the manner explained in detail hereinafter to limit the forward movement of the sleeve 35, and hence the wood bit secured therein, during the grinding operation.

Also secured to a projecting lug 80 on the forward end of the barrel 27 is a pivoted spacer member 81. This member functions, with the sleeve 35 removed from the barrel, to be swung inwardly across the inner opening in the barrel to properly position said barrel a spaced distance from the periphery of the grinding wheel 56, as explained in detail hereinafter.

As stated hereinbefore, the opening 66 in the block 65 is adapted to receive therein the sleeve and collet assembly for a particular size wood bit. Accordingly, the block may be provided with a plurality of such openings, and associated posts 68 and pedestals 70, to accommodate the preliminary adjustment of a number of sizes of wood bits. It is to be understood that the size of post 68 and relative positions of the projecting lug 69 and pedestal 70 will vary for different sizes of bits.

Means preferably is also incorporated in the apparatus for initially forming and subsequently maintaining the peripheral contour of the grinding wheel 56 during use. In the embodiment illustrated, this means includes an upstanding pedestal 85 supported pivotally at its lower end on pivot bolt 86, which extends through the spaced ears 87 secured to the base 20. Adjacent the top end of the pedestal is a shaft 89 which extends through the pedestal parallel with the axis of pivot bolt 86, and is secured against rotation by means of set screw 90. The forward end of the shaft is reduced in diameter to form a hub 91. A ring plate 92 is receivable on the hub and is mounted for rotation on the hub by means of bearing 93. This assembly is secured against axial displacement on the hub by means of the end plate 94 secured to the end of the hub by bolt 95.

The outer surface of the ring plate 92 receives thereon the crusher roll 96. This crusher roll is secured upon the ring plate between the rear shoulder 97 and the front collar 98, the latter being removably secured to the ring plate by means of interengaging threads. Thus, the crusher roll may be removed from the ring plate by removal of collar 98. The crusher roll comprises a metal ring which is formed with a peripheral groove 99 contoured to the desired shape to be formed on the periphery of the grinding wheel 56.

Intermediate the ends of the pedestal 85 there is formed a conical opening 100 (Figure 1), which is flared in the direction facing the drive shaft 51 of drive motor 50. Extending slidably through said opening is a control rod 101. The forward end of the control rod is pivotally connected by pivot pin 102 to a clamp 103 secured about the front bearing housing 104 of the drive motor 50, as by means of the securing bolt 105. The rearward end of control rod 101 is threaded to receive thereon the hand wheel 106, and the pedestal 85 is maintained in contact therewith by means of spring 107 which encircles the control rod and extends between the pivot 102 and the pedestal. Thus, by manipulation of the hand wheel 106, the pedestal may be pivoted about pivot bolt 86 to bring the crusher roll 96 into engagement with the grinding wheel 56. Upon rotation of the grinding wheel the crusher roll is caused to rotate, as is well-known in the art, and thus the periphery of the grinding wheel is contoured to the shape defined by the peripheral groove of the crusher roll.

The grinding wheel 56 is contoured by the crusher roll preferably by rotating the grinding wheel by hand while the crusher roll is in contact therewith. To this end, there is provided a crank 108, indicated by the dotted lines in Figure 1, which is adapted to be secured to the threaded end 53 of the motor drive shaft 51. By rotating the crank and simultaneously drawing the crushing roll 96 toward the grinding wheel, by means of hand wheel 106, the surface of the grinding wheel is formed to the proper contour defined by the crusher roll groove 99.

Mounted upon the top of the pedestal 85 is an electric motor 110. The drive shaft 111 of the motor supports a brush 112, preferably of the bristle type. The brush is maintained in contact with the peripheral groove of the crusher roll and serves to clean the grit deposited in the groove from the grinding wheel 56. This is desirable in order to insure the formation of a precise contour on the grinding wheel.

It will be understood that the crusher roll assembly may be provided as a separate mechanism. The arrangement illustrated is preferred, however, because it enables the dressing of a grinding wheel while in use on drive shaft 51, thereby overcoming the necessity of removing the wheel for treatment by additional equipment. The arrangement also insures against errors in contours being transferred from the grinding wheel to the bit, since the grinding wheel is retained on the same rotary shaft for both dressing and grinding.

In the use of the apparatus described hereinbefore, it will be understood that a separate grinding wheel 56 and crusher roll 96 must be provied for each different size of wood bit. Since the apparatus is particularly adapted for use by manufacturers whose operations involve the drilling of large numbers of holes of but a few standard sizes, it is contemplated that about six different sets of grinding wheels and crusher rolls will generally be sufficient. The block 65 will, of course, require the same number of openings 66 and corresponding posts 68 and pedestals 70 for the preliminary adjustment of the desired number of wood bits.

The operation of the apparatus is as follows: Assuming the wood bit shown in the drawings is to be sharpened and that the grinding wheel 56 has been dressed to precise contour by the crusher roll 96, the wood bit is first anchored to the sleeve 35. This is accomplished by inserting the wood bit through the collet 44, inserting the collet in the sleeve 35 and loosely securing the bushing 43 to the sleeve. The sleeve is then inserted in the opening 66 in block 65, with one of the oblique slots, for example slot 37, engaging the ball 71 on pedestal 70. The wood bit is then pushed downwardly until the chisel edges 18 rest upon the post 68. The bit is rotated, clockwise in Figure 1, until one of the chisel edges 18 abuts against the lug 69 projecting from the post. The cutting edges of the wood bit thus are aligned precisely with the oblique slot 37, whereupon the bushing 43 is tightened to draw the collet 44 firmly into engagement with the bit. The bit is thus secured against axial or longitudinal displacement with respect to the sleeve 35.

The sleeve assembly is then removed from the opening 66 preparatory to insertion in the barrel 27. First, however, the barrel is adjusted to proper position with respect to the grinding wheel, as follows: The barrel is first arranged in a horizontal plane, as in Figure 2, by inserting pin 33 in hole 31 and the bottom edge of flange 28 is brought into contact therewith. The locking screw 26 is then loosened and the spacer member 81 is swung across the opening in the barrel. The frame 21 is then moved forwardly toward the grinding wheel, along the key way 24, until the member 81 makes contact with the peripheral edge of the grinding wheel. The locking screw 26 is then tightened and the spacer member 81 withdrawn to the position shown in Figure 1.

The sleeve 35 is now placed within the barrel 27 and pushed forwardly therein, with guide rod 74 extending through the oblique slot 38. In Figure 1 the bit is shown in an intermediate position a spaced distance from the grinding wheel, merely to illustrate the relation between the bit and grinding wheel. Pin 33 is now withdrawn from hole 31 and inserted in hole 30, and the barrel is rotated downwardly about pivot 29 to bring flange 28 into contact with the pin. The sleeve is pushed forwardly sufficient to bring the cutting edge of the wood bit into engagement with the grinding wheel. The stop 76 is then adjusted to provide a few thousandths of an inch separation from flange 36. The bit is now in the angular position shown in Figures 4 and 5.

It is to be noted in Figure 1 that the upper quadrant of the wood bit engages the grinding wheel when guide rod 74 is in slot 38. Thus, by pushing forwardly on the sleeve assembly the bit is moved into the path of the wheel 56, which, as it is rotated by the drive motor 50, grinds and sharpens said section of the bit to the precise contour required.

It is to be noted further that, as the sleeve 35 is pushed forwardly into the grinding wheel, the sleeve is caused to rotate on its axis along the helical path established by the guide rod 74. Thus, the wood bit is also rotated on said helical path, which corresponds to the helical contour of the wood bit flutes 13, and hence the cutting edges 17 and 18 are always formed on the proper portion of the bit, i. e. the peripheral cutting lips 17 are always formed on the body portion 11 adjacent the lands 14 and the chisel surfaces 16 are always formed in the area of the flutes 13.

Upon completing the grinding and sharpening of the first cutting section illustrated in Figure 1, the sleeve assembly is withdrawn to the extent that guide rod 74 is disengaged from slot 38, and the sleeve is rotated 180° to bring the guide rod 74 into registry with slot 40. Thus, by moving the sleeve assembly forward, the second, opposite, cutting quadrant of the wood bit is caused to engage the grinding wheel and to be sharpened thereby. In addition, since the forward movement of the sleeve is restricted by the stop 76, the two cutting quadrants of the wood bit are ground to precisely the same depth and angle.

In sharpening the two chisel sections of the wood bit, as described above, the adjacent sides of the center spur 15 are also shaped. It is now necessary to shape the remaining two sides of the center spur, and this is accomplished as follows: The sleeve assembly is removed from the barrel to the extent that guide rod 74 disengages from slot 40. The barrel assembly is then swung upwardly about its pivot 29 until the upper surface of flange 28 engages with pin 33 which has been removed from opening 30 and inserted in opening 32. The sleeve 35 is then rotated to bring guide rod 74 into engagement with either one of the slots 37 or 39, and the sleeve assembly is then pushed forwardly toward the grinding wheel 56.

Figure 6:
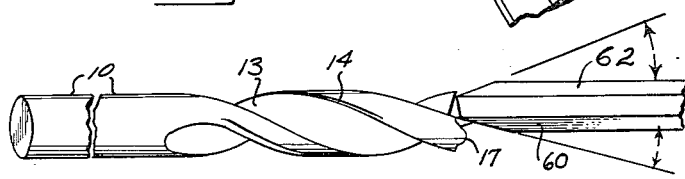
Figure 6 is a fragmentary foreshortened plan view showing the relative position between the wood bit and contoured grinding wheel in position for grinding the sides of the center spur normal to the chisel edges of the bit.
Figure 9:
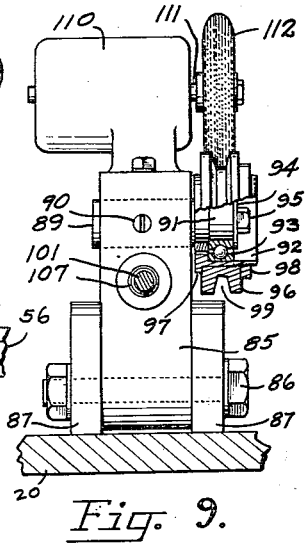
Figure 9 is a fragmentary sectional view taken along the line 9—9 in Figure 1 and showing details of construction of the grinding wheel dressing mechanism.
Figure 7:
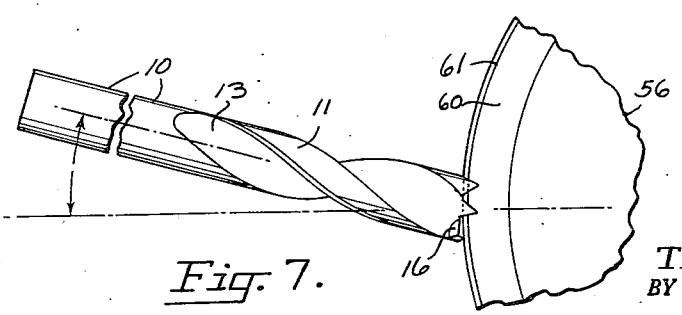
Figure 7 is a fragmentary foreshortened view in side elevation showing another angular relation between the wood bit and contoured grinding wheel for grinding the edges of the center spur normal to the chisel edges, as in Figure 6.

Figures 6 and 7 of the drawings illustrate the position of the bit with respect to the grinding wheel, and it is to be noted that this angular position of the bit affords engagement of the grinding wheel surface 60 with the center spur and yet keeps the grinding wheel out of contact with the peripheral cutting lip 17 and chisel surface 16. Thus, the surface of the spur adjacent the opposed surfaces first ground is faced to the same angle. The sleeve assembly is then withdrawn and rotated 180° to bring guide rod 74 into engagement with the other of said slots 37 or 39, whereby to face the last remaining surface of the spur.

From the foregoing, it is apparent that the present invention affords rapid and precise grinding and sharpening of wood bits of various sizes. By means of the crusher roll, grinding wheels of conventional construction are readily adaptable for use with the apparatus for the specific purpose of sharpening wood bits. Means is provided to insure proper and precise positioning of the bit with respect to the grinding wheel, and means is also provided for maintaining the required profile of the bit tip in precise and proper position with respect to the cutting helix. The apparatus is compact and is of simplified construction for economical manufacture.

It will be apparent to those skilled in the art that various changes may be made in the details of construction described hereinbefore without departing from the scope and spirit of this invention. It is to be understood, therefore, that the foregoing description is primarily illustrative of the invention and is not to be considered as limiting the scope thereof.

Having now described my invention and the manner in which the same may be used, what I claim as new and desire to secure by Letters Patent is:

1. The method of grinding wood bits having a cutting end including a central forwardly projecting spur, a pair of diametrically opposed radially extending chisel surfaces depressed from the spur, and peripheral cutting lips projecting forwardly from the outer sides of the chisel surfaces, said method comprising: providing a rotary grinding wheel with a peripheral contour matching the profile of one half of the cutting end of the bit, which profile is defined by the adjacent surfaces of the spur, chisel surface and cutting lip, positioning the bit and grinding wheel relative to each other with one of said halves of the cutting end disposed for registration with the matching surface of the grinding wheel and with the longitudinal axis of the bit fixed obliquely with respect to the tangent of the grinding wheel at their point of intersection and in the direction to taper the chisel surface rearwardly from the cutting end in the direction opposite the direction of rotation of the bit, moving the bit and grinding wheel relative to each other to bring said half of the cutting end of the bit into contact with the grinding wheel whereby to grind said half, separating the bit and grinding wheel, rotating the bit 180° on its longitudinal axis, positioning the bit and grinding wheel relative to each other with the other of said halves of the cutting end disposed for registration with the matching surface of the grinding wheel and with the longitudinal axis of the bit fixed obliquely with respect to the tangent of the grinding wheel at their point of intersection and in the direction to taper the chisel surface rearwardly from the cutting end in the direction opposite the direction of the bit, and moving the bit and grinding wheel relative to each other to bring said half of the cutting end of the bit into contact with the grinding wheel whereby to grind said half.

2. The method of claim 1, including the additional steps of separating the bit and grinding wheel, rotating the bit substantially 90° on its longitudinal axis, positioning the bit and grinding wheel relative to each other with the longitudinal axis of the bit disposed obliquely with respect to the tangent of the grinding wheel at their point of intersection and in the direction to clear the cutting lips from the grinding wheel during grinding of the remaining quadrants of the center spur, moving the bit and grinding wheel relative to each other to engage and grind one of said quadrants of the center spur with the grinding wheel, separating the bit and grinding wheel, rotating the bit 180° on its longitudinal axis, and moving the bit and grinding wheel relative to each other to engage and grind the remaining quadrant of the center spur with the grinding wheel.

3. The method of grinding wood bits having a helical body and a cutting end including a central forwardly projecting spur, a pair of diametrically opposed radially extending chisel surfaces depressed from the spur, and peripheral cutting lips projecting forwardly from the outer sides of the chisel surfaces, said method comprising: providing a rotary grinding wheel with a peripheral contour matching the profile of one half of the cutting end of the bit, which profile is defined by the adjacent surfaces of the spur, chisel surface and cutting lip, positioning the bit and grinding wheel relative to each other with one of said halves of the cutting end disposed for registration with the matching surface of the grinding wheel and with the longitudinal axis of the bit fixed obliquely with respect to the tangent of the grinding wheel at their point of intersection and in the direction to taper the chisel surface rearwardly from the cutting end in the direction opposite the direction of rotation of the bit, moving the bit and grinding wheel relative to each other to bring said half of the cutting end of the bit into contact with the grinding wheel while simultaneously rotating the bit on its fixed longitudinal axis along the helical path of the bit, whereby to grind said half, separating the bit and grinding wheel, rotating the bit 180° on its longitudinal axis, positioning the bit and grinding wheel relative to each other with the other of said halves of the cutting end disposed for registration with the matching surface of the grinding wheel and with the longitudinal axis of the bit fixed obliquely with respect to the tangent of the grinding wheel at their point of intersection and in the direction to taper the chisel surface rearwardly from the cutting end in the direction opposite the direction of rotation of the bit, moving the bit and grinding wheel relative to each other to bring said half of the cutting end of the bit into contact with the grinding wheel while simultaneously rotating the bit on its fixed longitudinal axis along the helical path of the bit, whereby to grind said half.

4. The method of claim 3 including the additional steps of separating the bit and grinding wheel, rotating the bit substantially 90° on its longitudinal axis, positioning the bit and grinding wheel relative to each other with the longitudinal axis of the bit disposed obliquely with respect to the tangent of the grinding wheel at their point of intersection and in the direction to clear the cutting lips from the grinding wheel during grinding of the remaining quadrants of the center spur, moving the bit and grinding wheel relative to each other to engage and grind one of said quadrants of the center spur with the grinding wheel, separating the bit and grinding wheel, rotating the bit 180° on its longitudinal axis, and moving the bit and grinding wheel relative to each other to engage and grind the remaining quadrant of the center spur with the grinding wheel.

5. In apparatus for grinding wood bits having a cutting end including a central forwardly projecting spur, a pair of diametrically opposed radially extending chisel surfaces depressed from the spur, and peripheral cutting lips projecting forwardly from the outer ends of the chisel surfaces: the combination of a base member, a rotary grinding wheel mounted on the base member and having a grinding surface which includes an intermediate transverse chisel surface grinding portion and spaced diverging spur and cutting lip grinding portions, and bit support means mounted on the base member, the grinding wheel and bit support means being mounted for relative movement on a fixed line toward and away from each other, the bit support means having a longitudinal axis and being adapted to support a bit coaxially with said axis, the bit support means being arranged with its longitudinal axis offset from the transverse grinding portion of the grinding wheel whereby the position one of the halves of the cutting end of a bit for registration with the said grinding surface of the grinding wheel, the longitudinal axis of the bit support means being fixed obliquely with respect to the tangent of the grinding wheel at their point of intersection in the direction to taper the chisel surface of a bit rearwardly from the cutting end in the direction opposite the direction of rotation of the bit.

6. In apparatus for grinding wood bits having a helical body and a cutting end including a central forwardly projecting spur, a pair of diametrically opposed radially extending chisel surfaces depressed from the spur, and peripheral cutting lips projecting forwardly from the outer ends of the chisel surfaces: the combination of a base member, a rotary grinding wheel mounted on the base member and having a grinding surface which includes an intermediate transverse chisel surface grinding portion and spaced diverging spur and cutting lip grinding portions, bit support means mounted on the base member for movement on a fixed line toward and away from the grinding wheel, the bit support means having a longitudinal axis and being adapted to support a bit coaxially with said axis, the bit support means being arranged with its longitudinal axis offset from the transverse grinding portion of the grinding wheel whereby to position one of the halves of the cutting end of a bit for registration with the said grinding surface of the grinding wheel, the longitudinal axis of the bit support means being fixed obliquely with respect to the tangent of the grinding wheel at their point of intersection in the direction to taper the chisel surface of a bit rearwardly from the cutting end in the direction opposite the direction of rotation of the bit, and guide means associated with the bit support means for rotating a bit on said longitudinal axis of the bit support means along the helical path of the bit body as the bit is moved toward and away from the grinding wheel, whereby to grind the bit along the helical path of its body.

7. In apparatus for grinding wood bits having a cutting end including a central forwardly projecting spur, a pair of diametrically opposed radially extending chisel surfaces depressed from the spur, and peripheral cutting lips projecting forwardly from the outer ends of the chisel surfaces: the combination of a base member, a rotary grinding wheel mounted on the base member and having a grinding surface which includes an intermediate transverse chisel surface grinding portion and spaced diverging spur and cutting lip grinding portions, support means mounted on the base member for movment on a fixed line toward and away from the grinding wheel, and bit retainer means mounted slidably on the support means for moving a bit on a fixed line toward and away from the grinding wheel, the bit retainer means having a longitudinal axis and being adapted to support a bit coaxially with said axis, the bit retainer means being arranged with its longitudinal axis offset from the transverse grinding portion of the grinding wheel whereby to position one of the halves of the cutting end of a bit for registration with the said grinding surface of the grinding wheel, the longitudinal axis of the bit retainer means being fixed obliquely with respect to the tangent of the grinding wheel at their point of intersection in the direction to taper the chisel surface of a bit rearwardly from the cutting end in the direction opposite the direction of rotation of the bit.

8. In apparatus for grinding wood bits having a helical body and a cutting end including a central forwardly projecting spur, a pair of diametrically opposed radially extending chisel surfaces depressed from the spur, and peripheral cutting lips projecting forwardly from the outer ends of the chisel surfaces: the combination of a base member, a rotary grinding wheel mounted on the base member and having a grinding surface which includes an intermediate transverse chisel surface grinding portion and spaced diverging spur and cutting lip grinding portions, support means mounted on the base member for movement on a fixed line toward and away from the grinding wheel, bit retainer means mounted slidably and rotatably on the support means for moving a bit on a fixed line toward and away from the grinding wheel and for rotating said bit axially on said fixed line, respectively, the bit retainer means having a longitudinal axis and being adapted to support a bit coaxially with said axis, the bit retainer means being arranged with its longitudinal axis offset from the transverse grinding portion of the grinding wheel whereby to position one of the halves of the cutting end of a bit for registration with the said grinding surface of the grinding wheel, the longitudinal axis of the bit retainer means being fixed obliquely with respect to the tangent of the grinding wheel at their point of intersection in the direction to taper the chisel surface of a bit rearwardly from the cutting end in the direction opposite the direction of rotation of the bit, and helical guide means interengaging the bit retainer means and support means for rotating a bit on said longitudinal axis of the bit retainer means along the helical path of the bit body as the bit is moved toward and away from the grinding wheel.

9. In apparatus for grinding wood bits having a cutting end including a central forwardly projecting spur, a pair of diametrically opposed radially extending chisel surfaces depressed from the spur, and peripheral cutting lips projecting forwardly from the outer ends of the chisel surfaces: the combination of a base member, a rotary grinding wheel mounted on the base member and having a grinding surface which includes an intermediate transverse chisel surface grinding portion and spaced diverging spur and cutting lip grinding portions, bit support means mounted pivotally and movably on the base member for rotation on an axis substantially normal to the plane of the grinding wheel and for movement on a fixed line toward and away from the grinding wheel, respectively, locking means selectively engaging the support means for positioning the latter in predetermined fixed positions of rotation with respect to the grinding wheel, the bit support means having a longitudinal axis and being adapted to support a bit coaxially with said axis, the bit support means being arranged with its longitudinal axis offset from the transverse grinding portion of the grinding wheel whereby in one of said predetermined fixed positions of adjustment to position one of the halves of the cutting end of a bit for registration with the said grinding surface of the grinding wheel, the longitudinal axis of the bit support means being fixed obliquely with respect to the tangent of the grinding wheel at their point of intersection in the direction to taper the chisel surface of a bit rearwardly from the cutting end in the direction opposite the direction of rotation of the bit, the bit support means being arranged in another of said predetermined fixed positions of adjustment to position the longitudinal axis of the bit support means obliquely with respect to the tangent of the grinding wheel at their point of intersection in the direction to clear the cutting lips of a bit from the grinding wheel during grinding of the remaining quadrants of the center spur.

10. The method of grinding wood bits having a cutting end including a central forward projecting spur, a pair of diametrically opposed radially extending chisel surfaces depressed from the spur, and peripheral cutting lips projecting forwardly from the outer sides of the chisel surfaces, said method comprising: providing a rotary grinding wheel with a peripheral contour matching the profile of one half of the cutting end of the bit, which profile is defined by the adjacent surfaces of the spur, chisel surface and cutting lip, positioning the bit and grinding wheel relative to each other with one of said halves of the cutting end disposed for registration with the matching surface of the grinding wheel and with the longitudinal axis of the bit fixed obliquely with respect to the tangent of the grinding wheel at their point of intersection and in the direction to taper the chisel surface rearwardly from the cutting end in the direction opposite the direction of rotation of the bit, moving the bit and grinding wheel relative to each other to bring said half of the cutting end of the bit into contact with the grinding wheel whereby to grind said half, separating the bit and grinding wheel, positioning the bit and grinding wheel relative to each other with the other of said halves of the cutting end disposed for registration with the matching surface of the grinding wheel and with the longitudinal axis of the bit fixed obliquely with respect to the tangent of the grinding wheel at their point of intersection and in the direction to taper the chisel surface rearwardly from the cutting end in the direction opposite the direction of rotation of the bit, moving the bit and grinding wheel relative to each other to bring said half of the cutting end of the bit into contact with the grinding wheel whereby to grind said half.

11. The method of claim 10, including the additional steps of separating the bit and grinding wheel, positioning the bit and grinding wheel relative to each other with the longitudinal axis of the bit disposed obliquely with respect to the tangent of the grinding wheel at their point of intersection and in the direction to clear the cutting lips from the grinding wheel during grinding of the remaining quadrants of the center spur, moving the bit and grinding wheel relative to each to engage and grind one of said quadrants of the center spur with the grinding wheel, separating the bit and grinding wheel, positioning the bit and grinding wheel relative to each other with the longitudinal axis of the bit disposed obliquely with respect to the tangent of the grinding wheel at their point of intersection and in the direction to clear the cutting lips from the grinding wheel during grinding of the remaining quadrant of the center spur, and moving the bit and grinding wheel relative to each other to engage and grind the remaining one of said quadrants of the center spur with the grinding wheel.

12. Apparatus for grinding wood bits having a cutting end including a central forwardly projecting spur, a pair of diametrically opposed radially extending chisel surfaces depressed from the spur, and peripheral cutting lips projecting forwardly from the outer ends of the chisel surfaces: said apparatus comprising a rotary grinding wheel having a grinding surface which includes an intermediate transverse chisel surface grinding portion and spaced diverging spur and cutting lip grinding portions, bit support means having a longitudinal axis and adapted to support a bit coaxially with said axis, means positioning the grinding wheel and bit support means relative to each other with said axis of the bit support means offset from the transverse portion of the grinding wheel whereby to position one of the halves of the cutting end of a bit at a time for registration with the said grinding surface of the grinding wheel, means positioning the grinding wheel and bit support means relative to each other with said axis of the bit support means disposed obliquely with respect to the tangent of the grinding wheel at the point of intersection of said axis and tangent in the direction to taper the chisel surface of a bit rearwardly from the cutting end in the direction opposite the direction of rotation of the bit, and means supporting said grinding wheel and bit support means for relative movement toward and away from each other.

13. The apparatus of claim 12 including means supporting the bit support means for locating said axis selectively at positions of rotation 180° apart while maintaining said oblique relationship, whereby selectively to position each half of a bit for grinding by the grinding wheel.

14. The appartus of claim 13 including adjustable means positioning the grinding wheel and bit support means relative to each other with said axis of the bit support means fixed at selected oblique positions with respect to the tangent of the grinding wheel at the point of intersection of said axis and tangent.

References Cited in the file of this patent

UNITED STATES PATENTS

| 209,782 | Swan | Nov. 12, 1878 |
| 302,527 | Swan | July 22, 1884 |
| 303,239 | Swan | Aug. 5, 1884 |
| 313,456 | Swan | Mar. 3, 1885 |
| 2,124,093 | Wells | July 19, 1938 |
| 2,147,227 | Ambler | Feb. 14, 1939 |
| 2,275,483 | Parker | Mar. 10, 1942 |
| 2,328,549 | Eich et al. | Sept. 7, 1943 |
| 2,491,346 | Wetzel | Dec. 13, 1949 |
| 2,494,825 | Melin | Jan. 17, 1950 |

FOREIGN PATENTS

| 202,134 | Great Britain | Aug. 16, 1923 |